United States Patent
Fehrenbach et al.

(10) Patent No.: US 7,397,657 B2
(45) Date of Patent: Jul. 8, 2008

(54) INPUT AND OUTPUT DEVICE DESIGNED FOR BEING DETACHABLY MOUNTED TO AN ELECTRONIC EQUIPMENT

(75) Inventors: Josef Fehrenbach, Haslach (DE);
Holger Staiger, Lauterbach (DE);
Jürgen Motzer, Gengenbach (DE);
Thomas Arnold, Alpirsbach (DE);
Johannes Falk, Georgen (DE); Thomas Deck, Wolfach (DE)

(73) Assignee: Vega Grieshaber KG, Wolfach (DE)

( * ) Notice: Subject to any disclaimer, the term of this patent is extended or adjusted under 35 U.S.C. 154(b) by 0 days.

(21) Appl. No.: 11/517,996

(22) Filed: Sep. 7, 2006

(65) Prior Publication Data
US 2007/0002528 A1    Jan. 4, 2007

Related U.S. Application Data

(63) Continuation of application No. 10/639,232, filed on Aug. 12, 2003, now Pat. No. 7,150,639.

(60) Provisional application No. 60/403,614, filed on Aug. 13, 2002.

(51) Int. Cl.
*H05K 7/10* (2006.01)
*H05K 5/02* (2006.01)
*H01R 13/66* (2006.01)

(52) U.S. Cl. ............... 361/681; 361/679; 439/151; 439/335

(58) Field of Classification Search ............ 361/610, 361/679, 681; 439/151, 335
See application file for complete search history.

(56) References Cited

U.S. PATENT DOCUMENTS

| | | | | |
|---|---|---|---|---|
| 4,749,364 A | * | 6/1988 | Arney et al. | 361/681 |
| 5,144,290 A | * | 9/1992 | Honda et al. | 345/156 |
| 5,193,069 A | * | 3/1993 | Furuya | 361/681 |
| 5,600,580 A | * | 2/1997 | Honjo et al. | 361/681 |
| 5,619,397 A | * | 4/1997 | Honda et al. | 361/686 |
| 6,233,138 B1 | * | 5/2001 | Osgood | 361/681 |
| 6,310,768 B1 | * | 10/2001 | Kung et al. | 361/681 |
| 6,373,689 B1 | * | 4/2002 | Yim | 361/681 |
| 6,530,784 B1 | * | 3/2003 | Yim et al. | 439/31 |
| 6,963,487 B2 | * | 11/2005 | Billington et al. | 361/686 |
| 2003/0235029 A1 | * | 12/2003 | Doherty et al. | 361/683 |

\* cited by examiner

*Primary Examiner*—Anatoly Vortman
(74) *Attorney, Agent, or Firm*—Fay Kaplun & Marcin, LLP

(57) ABSTRACT

Described is an input and output device for inputting or outputting data of an electronic equipment. The input and output device is designed for being detachably mounted to the electronic equipment in at least two different positions. The input and output device features a first contacting arrangement which, independent of the selected position in the mounted state of the input and output device on the electronic equipment, electrically comes in connection with a second contacting arrangement present on the electronic equipment. In one embodiment, orientation of the device may be varied, thereby enabling it to be coupled to a receiver by a bayonet connection and with a set of contacting arrangement engaging the second contacting arrangement in any orientation. Moreover, described are an operating and display module, as well as to a combination of an electronic equipment and an input and output device that can be detachably mounted thereto.

9 Claims, 7 Drawing Sheets

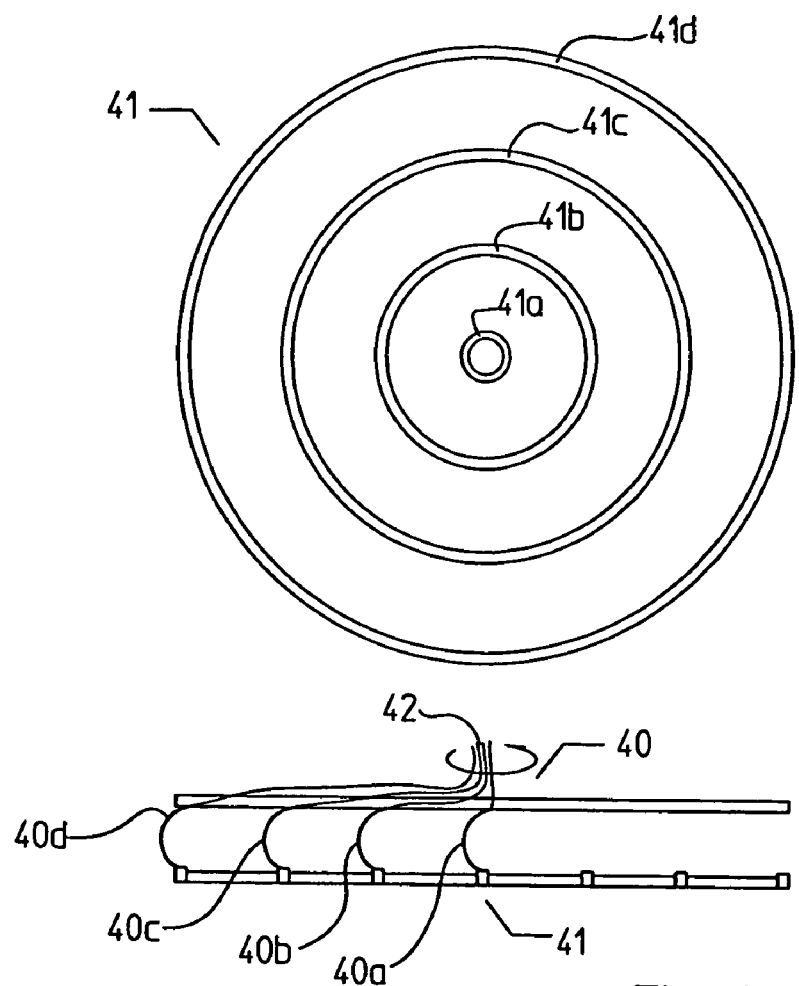
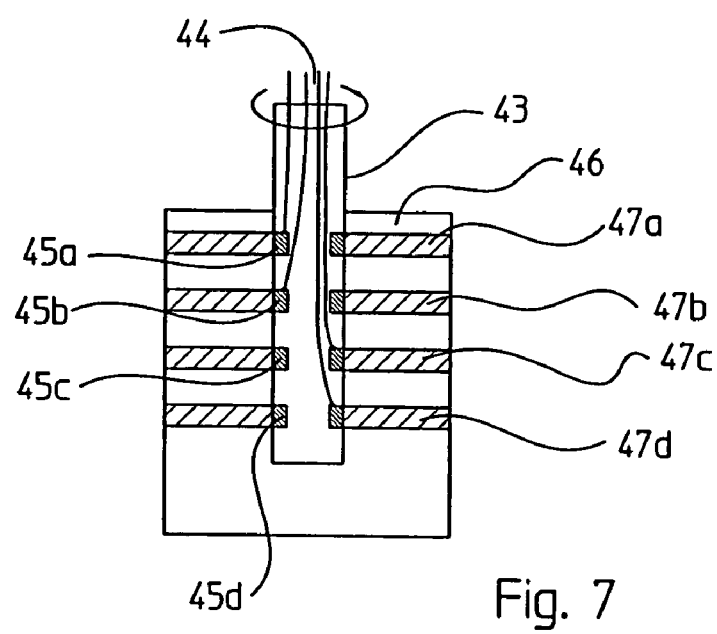
Fig. 6
Fig. 7

INPUT AND OUTPUT DEVICE DESIGNED FOR BEING DETACHABLY MOUNTED TO AN ELECTRONIC EQUIPMENT

PRIORITY CLAIM

This application claims the benefit of and is a continuation of U.S. patent application Ser. No. 10/639,232 filed on Aug. 12, 2003 now U.S. Pat. No. 7,150,639 which claims priority to U.S. Provisional Patent Application Ser. No. 60/403,614 filed on Aug. 13, 2002; specifications of both applications are expressly incorporated herein, in their entirety, by reference.

TECHNICAL FIELD

The present invention generally relates to an input and output device for inputting data or instructions for an electronic equipment and/or for displaying information from the electronic equipment, and to a display and operating module. Moreover, the invention relates to a combination of the input and output device and the electronic equipment.

For example, all kinds of field instruments or measurement devices constitute electronic equipment in the meaning of the present invention. The measurement devices may in particular be based on various measurement principles. In order to mention only some examples, filling level measurement devices, manometers, limit state detectors, thermometric devices, for example, fall under the term electronic equipment. With respect to filling level measurement devices, it has to be pointed out that in particular so-called TDR filling level measurement devices, radar measurement devices, hence, also ultrasonic measurement devices count among same. With respect to limit value transmitters, for example, vibrating-reed limit value transmitters and ultrasonic limit value transmitters have to be mentioned here.

Electronic equipment based on the mentioned measurement principles are, for example, available under the brand names VEGAPULS, VEGASON, VEGAFLEX, VEGASWING, VEGABAR, VEGACAP.

BACKGROUND OF THE INVENTION

Electronic equipment often has a display and/or an operating part. Display and operating part are firmly integrated in the housing of the respective electronic equipment. It may, for example, happen that an electronic equipment must be configured prior to its first use in an operating site, a fact that requires data to be inputted, for which purpose the operating part is used. After that, no further input may possibly be required or a further operation may only be required after a longer time interval. Also, a display such as an LCD display, is only purposeful under certain operational conditions. Since it can never be precluded that an input has to be carried out at the electronic equipment, or a display of device data is required in certain cases, all electronic devices have to be provided with such displays and/or operating parts. Thereby, the devices per se are costly to manufacture.

SUMMARY OF THE INVENTION

According to a first aspect of the invention, an input and output device is detachably mountable to an electronic equipment is provided for the first time. The input and output device is designed for being detachably mounted to the electronic equipment in at least two different positions, and has a first contacting means that, independent of the selected position in the mounted state of the input and output device on the electronic equipment, electrically comes into contact with a second contacting means that is present on the electronic device.

First, it has to be noted here that the term input and output device includes devices of various functions in the meaning of the present invention. According to this, for example, a device has to be understood that only serves for inputting data or instructions for the electronic equipment. Moreover, also a device may fall under the term input and output device that only serves for outputting data of the electronic equipment, i.e. that displays data or generally information of the electronic equipment to which it is mounted. Apart from that, input and output device may also include a device that permits the input as well as the output of information, or which optionally permits the former or the latter to be carried out.

All of the above-mentioned devices have in common that they are detachably mountable to an electronic equipment. In particular, it is also devised to provide electronic equipment of different designs and that is in particular even based on various measurement principles—such as pressure measurement, temperature measurement, filling level measurement on the basis of ultrasonic waves or microwaves, as well as filling level measurement and also, for example, limit state detection—with an always identically designed reception means that permits an input and output device according to the invention to be mounted.

According to a further aspect, an input and output device for inputting data and/or for displaying information of an electronic equipment is introduced, that comprises an attachment means for detachably mounting the input and output device to the electronic equipment, and a first contacting means that, in the mounted state of the input and output device on the electronic equipment, electrically comes into contact with a second contacting means present on the electronic equipment. The attachment means here may either be designed in such a manner that it only permits a single position for mounting the input and output device to the electronic equipment or that more than one position may be adopted. It is possible that the input and output device is also designed in such a manner that it may adopt any desired position on a circle, for which purpose the attachment means then may permit a rotational movement.

A further aspect of the invention relates to an operating and display module for an electronic equipment, with the module being designed for being detachably mounted to the electronic equipment in at least two different positions. The module includes at least one means of the group of means comprised of an input means and display means, a first attachment means, which may be detachably engaged in any selected mounting position on the electronic equipment by means of a second attachment means, and a first contacting means that, in the mounted state of the operating means on the electronic means, contacts a second electric contacting means that is part of the electronic equipment so as to transmit signals to the electronic device corresponding to the inputs into the input device and/or to display data from the electronic equipment on the display means.

According to a further aspect of the present invention, an electronic equipment is provided that is designed for detachably receiving an input and output device. The electronic equipment comprises a reception device for detachably mounting an input and output device, a contacting means that, independent of the selected position in the mounted state of the input and output device on the electronic equipment, electrically comes into connection with a contacting means present on the input and output device.

Furthermore, according to an exemplary embodiment of the present invention, a combination of an electronic equipment and an input and output device is proposed, in particular a combination of a plurality of electronic equipment of different designs and/or measurement principles, each of which possesses the same reception for an input and output device to be mounted thereto. Therewith, it is for the first time possible to operate a plurality of electronic equipment or to fetch their data and to display them on site by means of only one input and output device.

In a further exemplary embodiment of an input and output device according to the invention, the first contacting means comprises plural groups of contacting means, and the groups of contacting means are arranged spaced apart from each other. One advantage of such an arrangement may be that only one second contacting means needs to be present on the electronic device, which, depending on the selected position, electrically comes into contact with one of the groups of contacting means on the input and output device in the mounted state of the input and output device. Of course, it is also possible that the second contacting means present on the electronic equipment comprises plural groups of contacting means, and that only one contacting means is present on the input and output device. Also in this embodiment, it is guaranteed, independent of the selected position, that always a first contacting means and a second contacting means come into electric contact with each other.

A first contacting means may comprise at least one electric contact surface, and a second contacting means may comprise at least one electric spring contact, that comes into contact with the electric contact surface. Of course, it is also possible that the first contacting means is designed as an electric spring contact, and the second contacting means comprises at least one electric contact surface. Even other detachable contact connections known per se in the art, may be used in an exemplary embodiment of the present invention.

According to an exemplary embodiment of an input and output device according to the present invention, a first attachment means is present on the input and output device, which, in the mounted state of the device, detachably comes into engagement with a second attachment means provided on the electronic equipment. This design enables the input and output device to be fixed to the electronic equipment, preferably in the position selected each time.

A further exemplary embodiment of an input and output device according to the present invention provides that the first attachment means and the second attachment means together form a bayonet joint. Hereby, a secure and reliable attachment of an input and output device to an electronic equipment is ensured by a slight axial and rotational movement about a certain angle area, the connection, however, may be detached again. Moreover, it is also possible in such a design that the input and output device may be attached on the electronic equipment in a constructionally simple manner in various postures or positions or is fixed to the electronic equipment in any selected position.

In particular, in one exemplary embodiment of an input and output device according to the present invention, the first attachment means comprises at least one pivot, and the second attachment means comprises at least one pivot receiving recess, into which a pivot may be introduced, e.g. by means of a combined axial and rotational movement. The number of pivots and pivot receiving recesses allows the number of selectable positions for mounting the input and output device to the electronic equipment to be determined. In particular, it is appropriate, when at least two pivots are provided engaging into four recesses for receiving the pivots, so that at least two different positions may be adopted, in particular four different positions may be adopted, each of which turned by 90°.

In order to avoid an unintentional detachment of the input and output device, at least one of the pivot receiving recesses, in a further exemplary embodiment of an input and output device according to the present invention, is provided with a blocking means. This blocking means is in particular formed as an elevation that is placed in the pivot receiving recess and that needs to be passed by the pivot with blocking of the first and second attachment means.

One exemplary embodiment of an input and output device according to the present invention has an upper side and a lower side. The upper side faces the user and comprises at least one operating means and/or one display means. The operating and/or display means are in connection with the first contacting means. The first contacting means is present on the lower side and has contacting surfaces or contacting springs placed in various locations on the lower side, whereby a connection of the second contacting means is ensured in any possible position of attachment. As has already been mentioned before, it is in particular advantageous to provide two or three or four or five groups of contacting surfaces evenly spaced apart from each other on a circle, so that, depending on the number of groups of contacting means, the input and output device may adopt positions on the electronic equipment differing by 90°, 60° or 45°.

In a further exemplary embodiment of an input and output device according to the present invention, the input and output device comprises a device body, which in turn is provided on the lower side of a reception ring, which may be inserted in or slipped on a corresponding reception ring on the electronic equipment.

An further exemplary embodiment of an input and output device according to the present invention comprises at least one operating key and/or at least one display means.

The display means in particular is in connection with the first contacting means so as to be supplied by the electronic equipment with electric current for the display means and for displaying data of the electronic equipment.

According to a further aspect of the present invention, an input and output device comprises an attachment means for detachably mounting the input and output device to the electronic equipment, and a first contacting means that, in the mounted state of the input and output. device on the electronic equipment, electrically comes into contact with a second contacting means present on the electronic equipment. Such an input and output device needs not forcibly but may be designed such that it may be mounted to the electronic equipment in at least two different positions. Here, the essence of the invention is that the input and output device may be mounted detachably.

According to a further aspect of the present invention, an operating and display module is provided, with the operating and display module being designed for being detachably mounted to the electronic equipment in at least two different positions and comprising for this purpose at least one means of a group of means comprised of input devices and output devices, a first attachment means, that may be detachably engaged in each selected mounting position to the electronic equipment with a second attachment means present on the electronic equipment, and a first contacting means that contacts in the mounted state of the operating device on the electronic equipment a second contacting means that is part of the electronic equipment so as to transmit electric signals to the electronic equipment corresponding to the inputs into the input device.

As has already been explained before, in such an operating and display module in an exemplary embodiment, as well, the first attachment means and the second attachment means is designed as a bayonet joint. The input device may, for example, be selected from the group of input devices comprised of press button, switch, touch screen, key, roll, rocker switch and joystick. It is also possible to combine various input devices with each other.

In particular, in one exemplary embodiment of an operating and display module according to the present invention, the module is designed essentially cylindrical and fits into a cylindrical reception of the electronic equipment.

According to a further aspect of the present invention, a combination of an input and output device and at least one electronic equipment is provided. The combination is comprised of an input and output device for inputting data and/or for displaying information of an electronic equipment, and of at least one electronic equipment, with the input and output devices being designed for being detachably mounted to the electronic equipment in at least two different positions and comprising a first contacting means that, independent of the selected position in the mounted state of the input and output device on the electronic equipment, electrically comes into connection with a second contacting means present on the electronic equipment.

The electronic equipment may be selected from the group of devices comprised, for example, of pressure sensor, filling level sensor, limit value transmitter, temperature sensor.

In an exemplary embodiment of a combination according to the present invention, the electronic equipment has a reception means for receiving the input and output device, and an attachment means for fixing the input and output device to the electronic equipment.

In an exemplary embodiment of a combination according to the present invention, the reception means comprises a first plug-in means, and the input and output device comprises a second plug-in means.

In an exemplary embodiment of a combination according to the present invention, the attachment means for fixing the input and output device to the electronic equipment is a separate cover member.

In one exemplary embodiment of a combination according to the present invention, the cover member has an internal thread, and the electronic equipment has an external thread, whereby the latter may be screwed on the internal thread.

In a further exemplary embodiment of a combination according to the present invention, the reception means is designed for detachably mounting an input and output device in at least two different positions.

In an exemplary embodiment of a combination according to the present invention, the contacting means comprises at least one contact spring.

In conclusion, it has to be noted that single features of a device according to the invention such as the above-explained input and output device, the operating and display module, the electronic equipment, the combination, each may also be realized in the others.

BRIEF DESCRIPTION OF THE DRAWINGS

For the further explanation and the better understanding, several exemplary embodiments of the present invention are described in more detail in the following with reference to the attached drawings. Therein show:

FIG. 6 a schematic top and cross-sectional view of first and second contacting means according to an exemplary embodiment of the invention;

FIG. 7 a schematic cross-sectional view of first and second contacting means according to a further exemplary embodiment of the invention;

DESCRIPTION OF EXEMPLARY EMBODIMENTS OF THE PRESENT INVENTION

Figure 1:
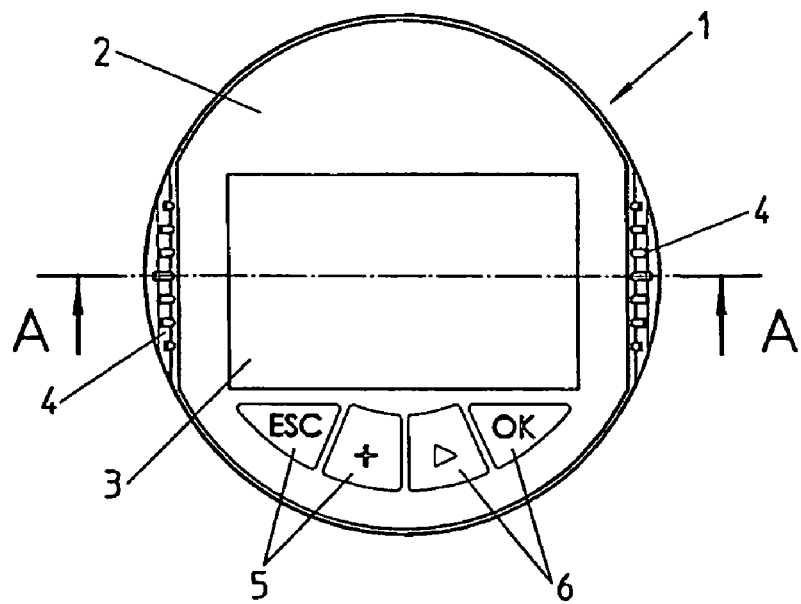
FIG. 1 a top view of an input and output device according to the present invention and an operating and display module.

From the top view of an input and output device 1 according to the present invention, the upper side 2 of the input and output device 1 with the therein contained display means 3 and operating keys 5, 6 can be clearly seen. The input and output device 1 has an essentially cylindrical body that shows two handle recesses 4. The handle recesses 4 are situated opposite each other and serve for a better handling of the input and output device 1, in particular for turning same.

In the exemplary embodiment shown here, the display means 3 is an LCD display placed in the center of the upper side 2 of the input and output device 1. On one longitudinal side of the display device 3, there are operating keys 5, 6. These operating keys 5, 6 serve the purpose of operating or configuring under menu control the electronic equipment to be connected to the input and output device, which electronic equipment will be described in detail in the following. Of course, even less or more keys 5, 6 may be mounted to an input and output device 1 according to the invention. Furthermore, it would of course also be possible to provide, for example, on the other longitudinal side of the display means 3 further switches and keys or operating members, respectively.

Figure 2:
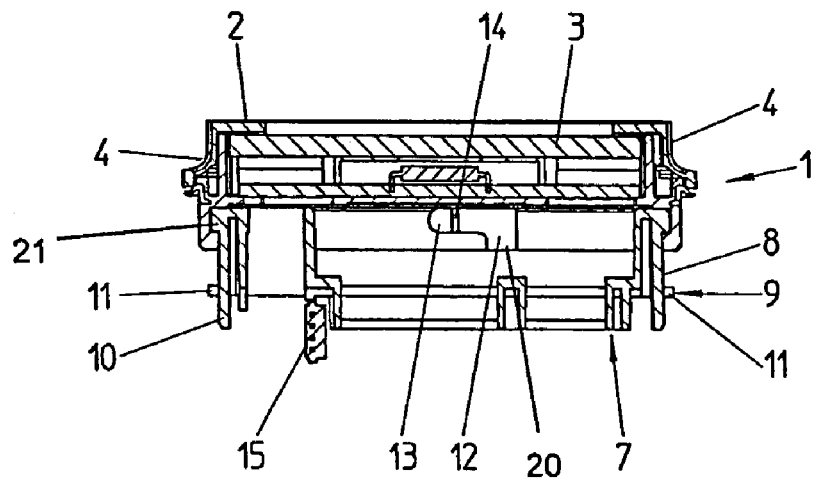
FIG. 2 a section of the input and output device taken along line A-A in FIG. 1.

FIG. 2 shows a section along line A-A of FIG. 1. As can be seen, the input and output device 1 here is already mounted to a reception part 8 that is normally firmly connected to an electronic equipment not shown here. The reception part 8 here is attached to the electronic equipment by means of attachment means 9, in particular locking projections 11. Thus, the reception part 8 rests with its lower side 7 on the upper side of the electronic equipment. It features an electric plug connection 15 connected to the electronic unit of an electronic equipment not shown here. This electric plug connection 15 is in connection with an electric contacting means of the electronic equipment, which will be explained below.

In particular, a pivot receiving recess 12 can be recognized in FIG. 2, into which a pivot not shown here may be introduced. In its rear part, the pivot receiving recess has a blocking elevation 14 delimiting a part 13 of the pivot receiving recess. The specific configuration of this attachment means will be explained in more detail with reference to FIG. 4.

Figure 3:
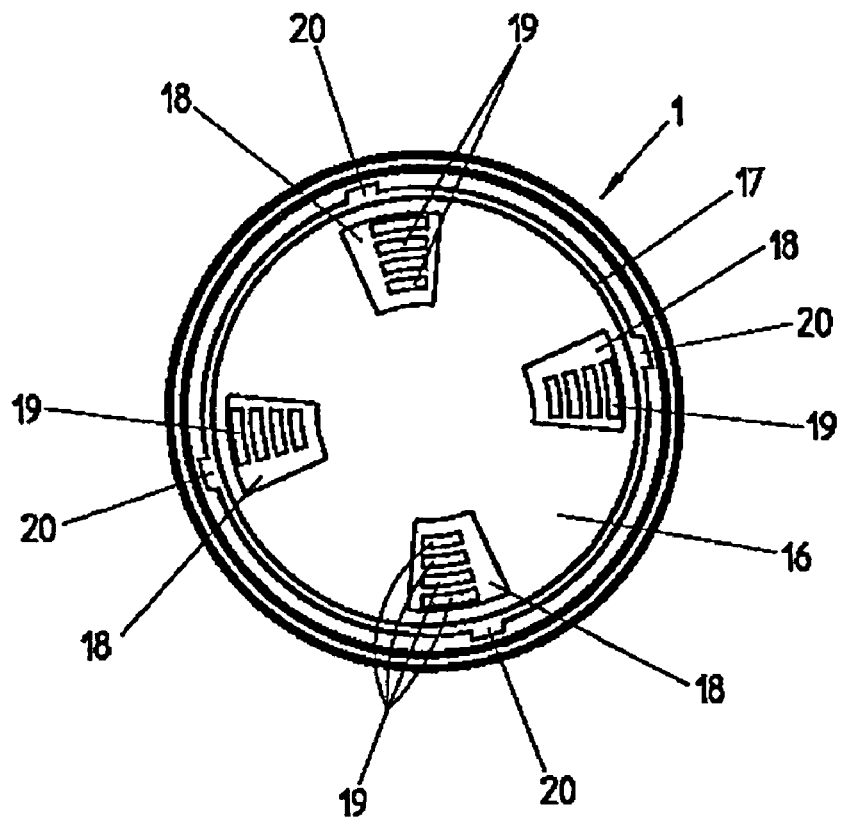
FIG. 3 a view from below of the input and output device shown in FIG. 1.

Further details of the input and output device 1 according to the invention can be seen in the view from below according to FIG. 3. As can be very well recognized, the input and output device 1 has a cylindrical body and accordingly a ring member 10, in which the pivot receiving recesses 12 end on the front side visible here. These openings of the pivot receiving recesses 12 are indicated with reference numeral 20. In total, four pivot receiving recesses 12 are present in the exemplary embodiment of an input and output device 1 shown in FIG. 3, each offset by 90°, which end in corresponding recesses or openings 20 on the front side of ring member 10.

Figure 4:
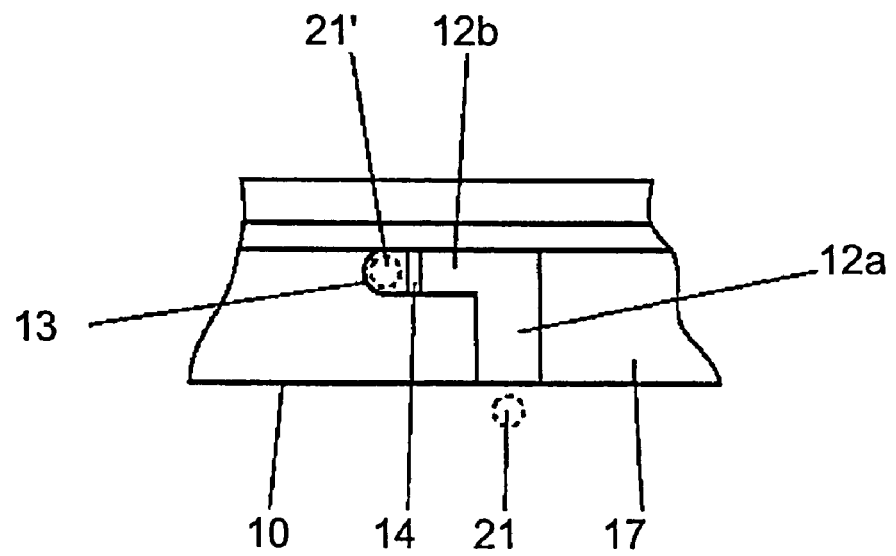
FIG. 4 a detail of the inner side of a ring member of the input and output device shown in FIGS. 1 through 3.

The ring member 10 hence features pivot receiving recesses 12 on the inner side 17 each shown in FIG. 4. The ring member 10 itself, as will be explained below, will be inserted in a corresponding tube or cylinder piece that is connected to the electronic equipment.

In the mounted state of the device, the lower side 16 of the input and output device is facing the electronic equipment. Here, four circle ring segment sections 18 are present, in each of which several contact surfaces 19 are grouped. Each group of contact surfaces 19 has the shape of a ring segment. These contact surfaces 19 are connected to the operating keys 5, 6 or the display means 3 via a line not shown here. They serve for establishing a contact with the second contacting means 23 present on the electronic device which are explained in more detail in FIG. 5. In the exemplary embodiment shown in FIG. 3, four groups of contacting means, hence the contact surfaces 19, are present so as to allow that the input and output device 1 can be mounted in four different positions on the electronic equipment and that in each selected position a contact may be established with the second contacting means 23 of the electronic equipment.

Figure 5:
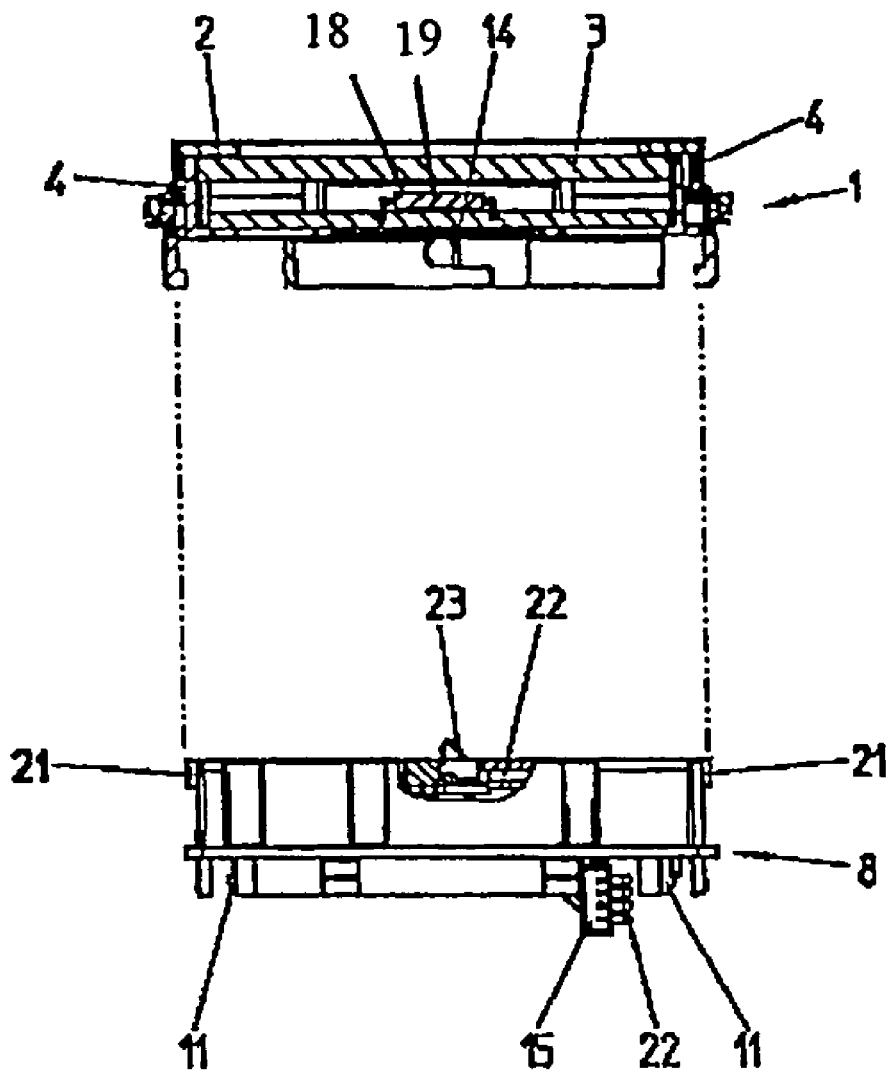
FIG. 5 a schematic sectional view of a reception part that may be attached to an electronic equipment by a snap-on catch and that serves for receiving an input and output device according to the preceding Figures.

The reception part 8 of the electronic equipment is shown in FIG. 5 in a schematic partial section. As can be seen, the reception part 8 is provided with several pivots on the upper side, i.e. with at least three pivots, that have to be introduced into the pivot receiving recesses 12 or their associated openings 20. On the opposite side, several locking projections 11 are present that may be firmly hooked in a corresponding counterpart on the electronic device so that the reception part 8 and the electronic equipment are firmly connected to each other. The reception part 8 has the form of a tube, to the outside of which the pivots 21 are mounted so that the outside may be put onto the inside 17 of the input and output device 1 and may be secured by an axial and rotational movement, as it is usual for bayonet joints, in the desired position of the input and output device 1 on the reception part 8.

In a schematic view in FIG. 5, the second contacting means 23, as well, is shown in the form of one or more contact springs 23 connected to an electric line 22 by means of the electric plug connection 15 already explained above. The electric plug connection 15 may then in turn be connected to the electronic equipment.

The electric contact springs 23 in the representation shown in FIG. 5 are bent from the horizontal in order to ensure a contact with the respective contact surfaces 19 of the input and output device in the state placed on the electronic equipment even with a different spacing of the contact surfaces from the contact spring. When the input and output device 1 according to FIGS. 1 through 4, and the reception part 8 of the electronic equipment, not shown here, are connected, then only one group of contact springs 23 need to be present that make contact with a group of contact surfaces 19. Of course, it is also possible that several groups of contact springs 23 are present on the reception part 8, and only one group of contact surfaces 19 is provided on the input and output device 1.

From the top or sectional views according to FIG. 6, a further exemplary embodiment of the present invention can be seen having a first contacting means 40 and a second contacting means 41. The first contacting means 40 comprises several radially spaced contact springs 40a, 40b, 40c, 40d connected to the associated electric or electronic means of the display and operating module via lines 42. Hence, it can be noted that the first contacting means 40a-40d are mounted to the display and operating module.

The second contacting means comprises annular conductor tracks 41a, 41b, 41c, 41d arranged concentrically to each other. The conductor tracks 41a-41d are part of an electronic equipment intended for being detachably connectable to an input and output device comprising the first contacting means 40a-40d. As can be seen from the representation according to FIG. 6, the contacting springs 40a-40d are arranged so as to contact the individual conductor tracks 41a-41d when the display and operating module is in the placed state. Due to the concentric configuration, the establishment of a contact is guaranteed in any desired rotational position of the display and operating module. This easily allows the display and operating module to be operated on the electronic equipment in such a manner that a user or observer may in each case adjust the position that is most appropriate to him.

Still another exemplary embodiment of the present invention having a first contacting means and a second contacting means is shown in the schematic representation according to FIG. 7. Here, the first contacting means comprises a pivot 43 featuring slip rings 45a, 45b, 45c and 45d at various heights on the outer periphery. These slip rings 45a-45d each are connected to lines 44 leading to the individual electric or electronic means of a display and operating module.

An electronic equipment to be connected to a corresponding display and operating module has a reception bore 46, on the inner circumference of which single contacting rings 47a, 47b, 47c and 47d are arranged at various heights. By introducing the pivot 43 into the reception bore 46, the first contacting means 45a-45d come in electrical contact with the second contacting means 47a-47d. Due to the pivot configuration, a rotation of the pivot 43 in the reception bore 46 is possible while an electric contacting between the first and second contacting means is maintained. Therewith, the same effect is achieved as with the exemplary embodiment according to FIG. 6.

Figure 8:
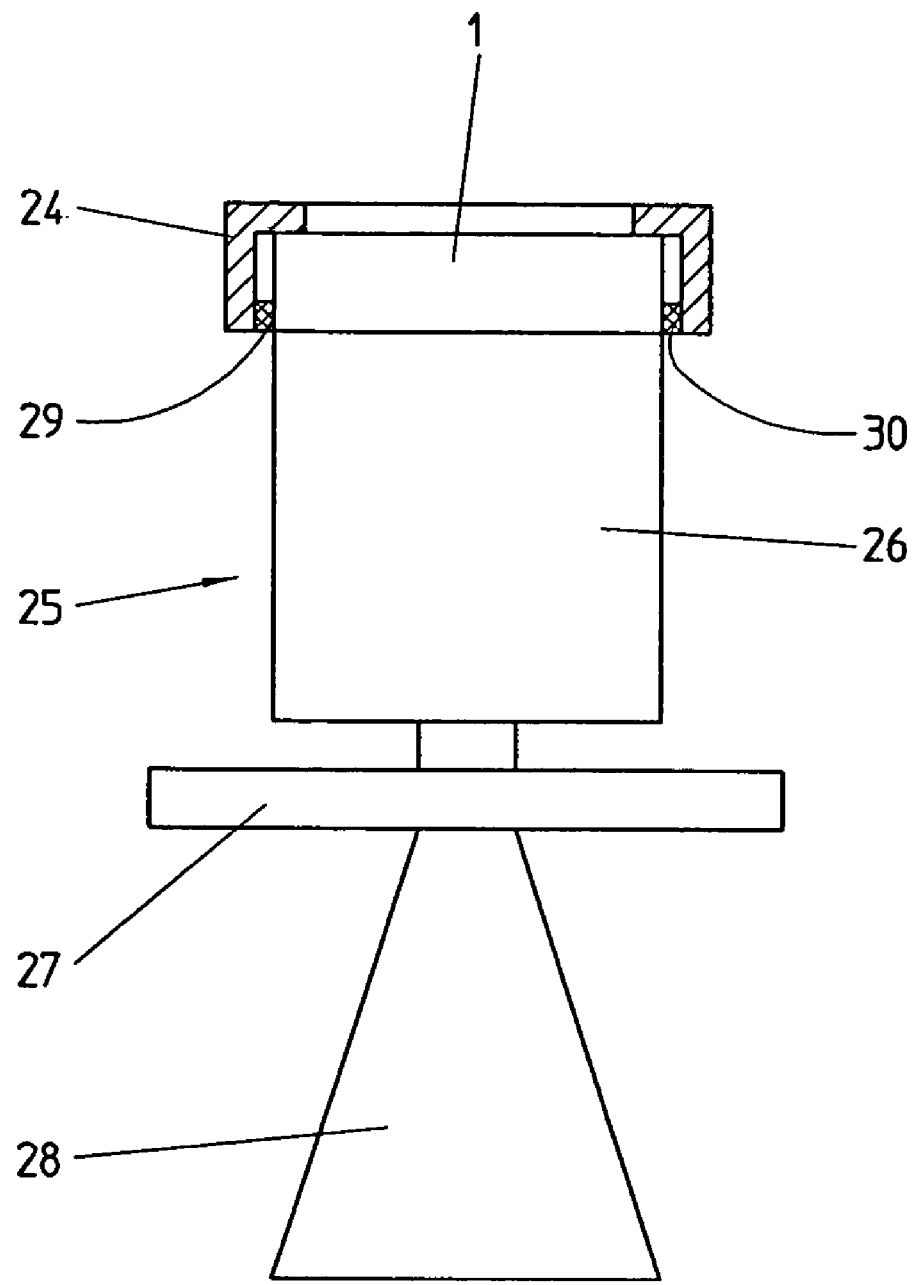
FIG. 8 a schematic side view of a partially sectioned representation of an electronic equipment that is designed for receiving a detachably mountable input and output device according to the preceding Figures.

In the schematic, partially broken representation of FIG. 8, an electronic equipment 25 is shown carrying an input and output device 1. The electronic equipment 25 here is a filling level radar comprising an electronic unit 26 with a housing, a fastening flange 27, and a horn antenna 28. On the upper side of the housing 26, an external thread 29 is present into which an internal thread 30 of a cover member 24 is screwed. The cover member 24 has a break-through 37 so that the display means located below of the input and output device 1 only outlined schematically here, becomes visible for an observer. Moreover, the operating keys 5, 6 of the input and output device 1, of course, can be reached by a user. As can be seen from FIG. 8, the input and output device 1 is secured by means of the cover member 24 after placement of the input and output device 1 on the reception part 8. Under certain circumstances, it is also sufficient that the input and output device 1 is only attached via the cover member 24 by clamping to the housing 26 of the electronic equipment 25.

Figure 9:
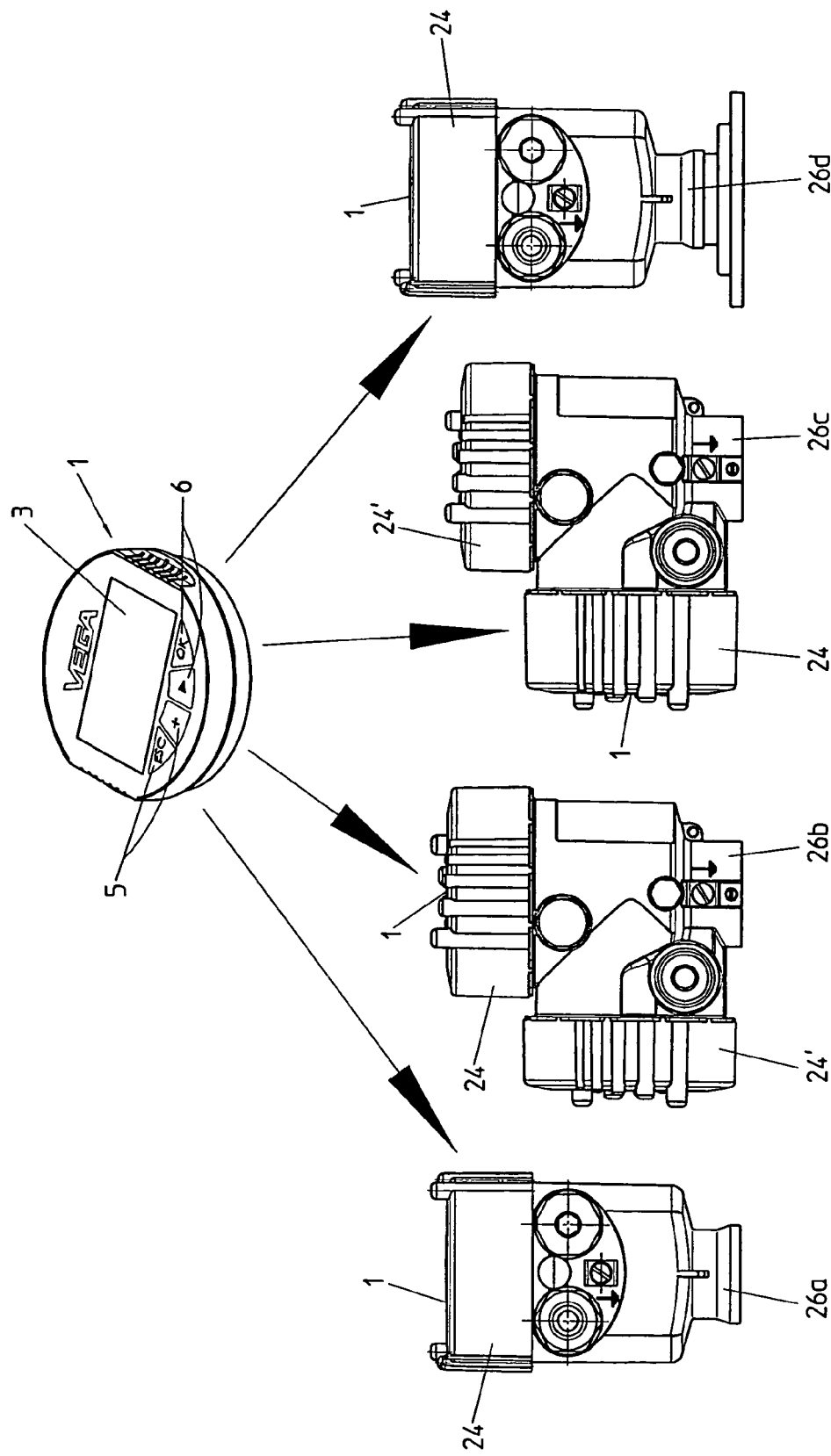
FIG. 9 a schematic representation of housings in which an input and output device or a display and operating module may be mounted, and FIG. 10 a representation of various electronic equipment sets according to the invention, which may be used with an input and output device according to the invention.

FIG. 9 schematically shows the various kinds of use of a single input and output device 1 such as it has been described above, on various housings 26a-26d. The housing 26a of an electronic equipment, for example, is a single-chamber housing that may be used for most diverse kinds of electronic equipment explained in more detail in FIG. 10.

An input and output device 1 may be mounted to this housing 26a and may be screwed by means of the cover 24.

Housing 26b is a dual-chamber housing featuring two possibilities for mounting the input and output device 1, in one case on the top, in the other on the side. In each case, a cover 24 or 24' may be screwed on (this cover differs from cover 24 in that it does not feature a break-through opening).

On housing 26c, the different mounting of the input and output device 1 is visible. A further housing design 26d is shown on the right side in FIG. 9. Here, the input and output device 1 only serves for displaying. Operating activities are not intended to be possible, therefore, the operating keys 6, 7 may be omitted in the input and output device 1.

In conclusion, it has to be noted that the input and output device 1 may be mounted to various housings designed for accommodating the input and output device 1, and may be used accordingly as an operating and display module; and this, incidentally, independent of the measurement principle on which the electronic equipment is based. Moreover, the housings 26a-26d may be made of various materials. This, depending on the purpose of application, e.g. a plastic housing, a V4A housing or an aluminum housing may be concerned.

The electronic equipment that can be used with such a housing and an input and output device 1 according to the invention are represented in FIG. 1 in an manner. Thus, in FIG. 10, on the very left, there is shown a measurement device comprising a swing fork 31 as a sensor. This measurement device is available under the designation "VEGASWING". Here, it is provided with a housing according to the invention including a reception part and a mountable input and output device 1. Furthermore, a cover 24 may be screwed on.

The second electronic equipment from the left is a TDR filling level sensor 25b featuring a carrying part 32 from which a microwave is emitted in a guided manner and reflected echoes return to the device. This electronic equipment 25b, as well, has a housing 26 for accommodating an input and output device 1 including a cover 24. The electronic equipment 25c shown at the right side of the aforementioned electronic equipment 25b is a pressure sensor which likewise features again an identical housing 26 for mounting an input and output device 1 and a cover member 24.

At the right side of the pressure sensor 25c, a filling level radar sensor 25d is shown featuring a horn antenna 28. The housing 26 again is designed in the manner described before. At the right side of the filling level radar 25d, a further filling level radar 25e is shown, in this case equipped with another antenna 34 (fully covered antenna). The housing 26 is designed as it os the case with the filling level radar 25d.

Further to the right, a limit state detection sensor 25f is shown featuring a swing rod 35. Again, the sensor has a housing 26 of the construction described before including a cover member 24, with the initially described input and output device 1 being mountable to the housing 26.

Figure 10:
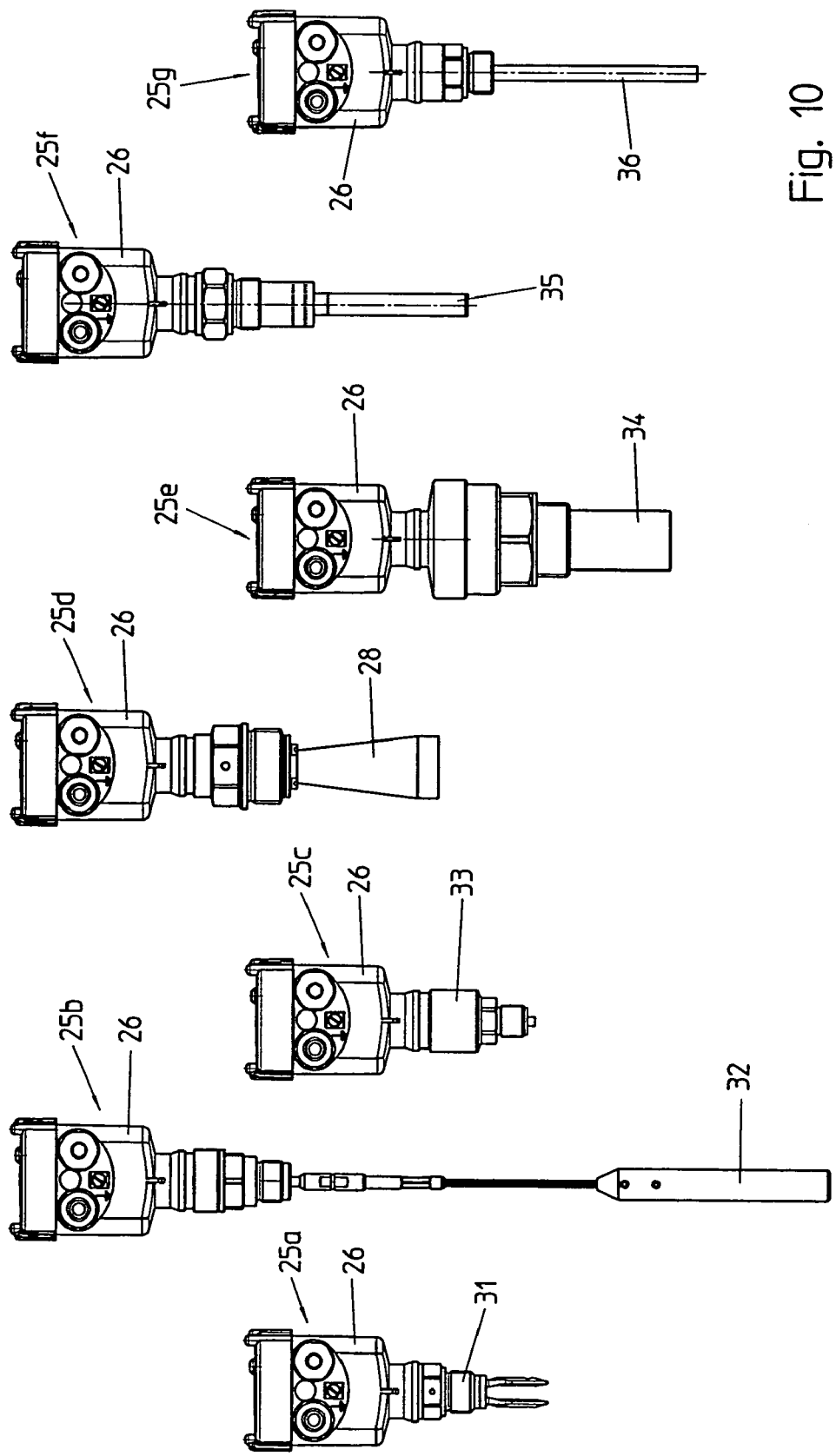

Finally, at the very right of FIG. 10, a capacitive filling level indicator 25g is shown featuring an electronic rod 36. Again, this filling level sensor is equipped with a housing 26 of the design described before.

Thus, it can be clearly recognized that all of the different measurement principles and the corresponding sensors may be equipped with the same input and output device 1, for which purpose these housings are of the same design. Therewith, a simple and modular exchange of an input and output device 1 on various sensors is possible. At the same time, it is rendered possible that a user always is faced with the same operation due to the input and output device 1, independent of the present sensor, and accordingly, the menu mode, as well, is similar.

What is claimed is:

1. A system, comprising:
   an electronic equipment; and
   an input and output device for at least one of inputting data and displaying information of the electronic equipment, the input and output device being detachably mountable to the electronic equipment in at least two different rotational positions,
   wherein, the input and output device includes a plurality of first contacting arrangements, each of the first contacting arrangements configured to electrically couple to a second contacting arrangement of the electronic equipment, the first contacting arrangements spaced-apart and disposed at different rotational positions along the input and output device to permit electrical coupling between the input and output device and the electronic equipment at the different rotational positions of the first contacting arrangements,
   wherein the electronic equipment includes (i) a reception arrangement which receives the input and output device and (ii) an attachment arrangement which fixes the input and output device to the electronic equipment,
   wherein the attachment arrangement is a separate cover member, and
   wherein the cover member has an internal thread, and the at least one electronic equipment has an external thread, onto which the internal thread is screwed.

2. The system according to claim 1, wherein the at least one electronic equipment is selected from a group consisting of a pressure sensor, a filling level sensor, a limit value transmitter and a temperature sensor.

3. The system according to claim 1, wherein the reception arrangement includes a first plug-in arrangement and wherein the input and output device includes a second plug-in arrangement.

4. The system according to claim 1, wherein the first contacting arrangement includes at least one contact spring.

5. The system of claim 1, wherein each of the plurality of first contacting arrangements provide the same electrically connectivity to the input and output device.

6. A system, comprising:
   an electronic equipment; and
   an input and output device for at least one of inputting data and displaying information of the electronic equipment, the input and output device being detachably mountable to the electronic equipment in at least two different rotational positions,
   wherein, the input and output device includes a plurality of first contacting arrangements, each of the first contacting arrangements configured to electrically couple to a second contacting arrangement of the electronic equipment, the first contact arrangements spaced-apart and disposed at different rotational positions along the input and output device to permit electrical coupling between the input and output device and the electronic equipment at said different rotational positions,
   the system further comprising a first attachment arrangement disposed on the input and output device and a second attachment arrangement disposed on the electronic equipment, said first and second attachment arrangements complementanly configured to permit rotational engagement of the input and output device relative to the electronic equipment until a point of secure engagement is reached therebetween, and wherein the first attachment arrangement and the second attachment arrangement together form a bayonet joint.

7. The system according to claim 6, wherein the electronic equipment is selected from a group consisting of a pressure sensor, a filling level sensor, a limit value transmitter and a temperature sensor.

8. The system according to claim 6, wherein the first contacting arrangement includes at least one contact spring.

9. The system of claim 6, wherein each of the plurality of first contact arrangements provide the same electrically connectivity to the input and output device.

* * * * *